United States Patent
Wasserman et al.

(10) Patent No.: US 6,207,211 B1
(45) Date of Patent: Mar. 27, 2001

(54) ROASTED COFFEE AND COFFEE ROASTING METHOD

(75) Inventors: Gerald S. Wasserman, Hoboken; Niphon Rerngsamai, Old Bridge, both of NJ (US); Dennis F. Hayes, Brewster, NY (US); Edmund Frank Mofford, Jacksonville, FL (US); Chantal Dabdoub, White Plains, NY (US)

(73) Assignee: Kraft Foods, Inc., Northfield, IL (US)

( * ) Notice: Subject to any disclaimer, the term of this patent is extended or adjusted under 35 U.S.C. 154(b) by 0 days.

(21) Appl. No.: 09/274,716

(22) Filed: Mar. 22, 1999

(51) Int. Cl.$^7$ ........................................ A23F 5/04
(52) U.S. Cl. ................ 426/466; 426/595; 426/467
(58) Field of Search .................... 426/595, 523, 426/466, 467

(56) References Cited

U.S. PATENT DOCUMENTS

| | | | |
|---|---|---|---|
| 3,122,439 | 2/1964 | MacAllister et al. | 99/68 |
| 3,595,668 | 7/1971 | Nutting et al. | 99/68 |
| 4,169,164 | 9/1979 | Hubbard et al. | 426/467 |
| 4,322,447 | 3/1982 | Hubbard | 426/467 |
| 4,501,761 | 2/1985 | Mahlmann et al. | 426/467 |
| 4,737,376 | 4/1988 | Brandlein et al. | 426/467 |
| 4,857,351 | * 8/1989 | Neilson et al. | |
| 4,988,590 | 1/1991 | Price et al. | 426/595 |
| 5,160,757 | 11/1992 | Kirkpatrick et al. | 426/466 |

OTHER PUBLICATIONS

ACM Symposium Series 5, "Thermally Generated Flavor, Maillard, Microwave & Extrusion Processes". Chapter 16: Formation Pathways for Primary Roasted Coffee Aroma Compounds. Authors: W. Holscher and H. Steinhart—1994.

* cited by examiner

Primary Examiner—Anthony J. Weier
(74) Attorney, Agent, or Firm—Thomas A. Marcoux

(57) ABSTRACT

A two stage coffee roasting process includes a first stage, green coffee beans are roasted for 5–15 minutes to a roast color of 30–50 Lu. In a second stage, the beans are further roasted for ½–3½ minutes to a roast color of 4–19 Lu. The roasted beans have a reduced density in the range of 0.27–0.38, and a roast color of 4–19 Lu. Analysis of sulfur compounds in the coffee aroma reveals a high level of methylmercaptan, a key compound for the pleasant aroma of freshly roasted and ground coffee. Coffee beans roasted in accordance with the present invention have a generally high titratable acidity at a given density and roast color.

8 Claims, No Drawings

ROASTED COFFEE AND COFFEE ROASTING METHOD

BACKGROUND OF THE INVENTION

The present invention relates to roasted coffee and to a method of roasting coffee.

Numerous roasting processes are known and employed in the roasting of green coffee beans. In conventional roasting, the coffee beans are contacted with hot roasting gas which transfers heat to the coffee beans and increases the temperature of the coffee beans to cause roasting to a desired color. Modifications of conventional roasting processes have been made to accomplish roasting in a relatively short period of several minutes or less. Such "fast roasting" systems have been found to produce an improvement in the amount of water soluble solids extractable from the roasted coffee.

Roasted and ground coffee has been widely sold for many years in the United States and other countries in a "one pound" size can which holds 1,000 cc of the coffee and which yields about 85 cups of coffee. A 1,000 cc quantity of roasted and ground coffee made by grinding coffee beans which have been roasted by a conventional roasting process weighs about 16 ounces. Fast roasting conditions which cause an increase in brew yield have the additional effect of reducing the density of the roasted and ground coffee. The increase in brew yield makes it possible to obtain the same number of cups of coffee from a lower weight of coffee beans, thus providing a potential cost savings both to the manufacturer and the consumer. The decrease in density makes it possible to obtain the same, or approximately the same, number of cups of coffee from a given volume of coffee. This makes it convenient for the consumer to use the less dense coffee since the volume of coffee employed by the consumer in brewing is essentially the same as the consumer had used in brewing conventional roasted coffee.

While the reduced density of fast roast coffee has the advantages mentioned above, conventional roasting is still employed commercially to satisfy consumer demand for coffee having aroma and flavor characteristic of roasted coffee. One of the important characteristics of roasted coffee is the aroma of freshly roasted and ground coffee. As reported at page 211 of the ACS Symposium Services "Thermally Generated Flavor, Maillard, Microwave and Extrusion Processes", Parliment et al., Editors, American Chemical Society, Washington D.C. (1994), methanethiol (or methylmercaptan) is a key compound for the pleasant aroma arising from freshly roasted and ground coffee and its quantification has been suggested as an analytical monitoring process for roasted whole bean freshness.

There is a need for low density coffee which retains the increased brew yield of fast roasted coffee and which has an enhanced package headspace methylmercaptan content.

SUMMARY OF THE INVENTION

The roasting method of the invention comprises:

(a) in a first stage, contacting green coffee beans with heated roasting gas for a time period of from 5 to 15 minutes until the coffee beans are roasted to a roast color of from 30–50 Lu;

(b) in a second stage, contacting the coffee beans roasted in the first stage with heated roasting gas for a time period of from 0.5 to 3.5 minutes to produce roasted coffee having a roast color of from 4–19 Lu; and (c) rapidly cooling the roasted coffee to terminate roasting to produce roasted coffee having a density of from 0.27 to 0.38 and a roast color of 4–19 Lu.

Roasted coffee beans in accordance with the invention have a density of from 0.27 to 0.38, a roast color of 4–19 Lu, and a package headspace methylmercaptan content of at least 10 micrograms per gram of coffee.

Roasted and ground coffee in accordance with the invention is prepared by grinding beans roasted in accordance with the invention.

DEFINITIONS

"Density" when used herein in connection with roasted coffee beans means free flow density measured by permitting a sample of beans to freely fall from a hopper having an opening, controlled by a slide gate, with the opening positioned three inches above an open-topped cube measuring 4 inches on a side and with the open top of the cube centered beneath the opening of the hopper. The slide gate is opened, permitting beans to freely fall from the hopper into and to overflow the cube. The excess coffee is then struck off the top of the cube with a straight edge, by a pushing and sawing motion and without tapping, until the sample is level with the top of the cube. The weight of the sample is then determined and the free flowing density determined based on the volume of the cube.

"Package headspace methylmercaptan content" when used herein in connection with roasted coffee beans means the content of methylmercaptan in the headspace of packaged roasted and ground coffee prepared from roasted coffee beans and determined by the following procedure. Twenty-four hours after roasting, the roasted beans are ground to a medium grind (approximately 800 microns as measured by a Sympatec laser particle size analyzer) with a benchtop coffee grinder (Modern Process Equipment Co., Chicago, Ill.). Thirty to forty minutes after grinding, the product is packed in a traditional one pound coffee tin and vacuum packed (29" Hg vacuum). After storing for 5 to 9 days at ambient conditions, the can is pierced and allowed to come to atmospheric pressure. The hole is then sealed with a septum. After 30 minutes at room temperature to allow the can to equilibrate, a 1 cc sample of headspace is extracted through the septum with a gas syringe. The extracted sample is then subjected to gas chromatography to determine the amount of methylmercaptan in the 1 cc sample. The total amount of methylmercaptan in the package headspace is then calculated by multiplying the amount in the sample by the void volume within the tin. The void volume within the tin is calculated by subtracting the actual volume (i.e., based on true density of the coffee as opposed to its bulk density) occupied by the coffee in the tin from the total volume of the tin.

"Roast color", in "Lu" units, means roast color which is indirectly measured using visible light reflectance of a ground sample of the roasted coffee beans, using a Dr. Lange Color Reflectance Meter Model LK-100 with an internal 640 nm filter. (Dr. Lange GmbH, Dusseldorf, Germany). The beans are ground in a benchtop coffee grinder (Modern Process Equipment Co.) to achieve an ADC (i.e., automatic drip coffeemaker) grind of 780 microns. The ground coffee sample is then poured loosely into a petri dish in the leveling device supplied with the Dr. Lange reflectance meter. A handle is then manipulated to obtain a flat surface on the sample. The petri dish is then removed from the leveling device and placed in the drawer of the reflectance meter. The instrument is then activated and the reflectance measurement is displayed. The lower the reflectance value, the darker the roast color.

Particle sizes are determined by a Sympatec HELOS/LA laser diffraction spectrometer with a 2000 mm optical system (Sympatec, Inc., Princeton, N.J.). The funnel height and feed rate of the sample are adjusted to give an optical concentration passing through the laser of about 5–10%. The sample size is preferably about 100 grams.

"Titratable acidity" is reported as ml of a 0.1N sodium hydroxide needed to titrate a 100 ml aliquot of brewed coffee to a pH of 6.0. The 100 ml aliquot is taken from a brew prepared in a MR. COFFEE domestic automatic drip coffee maker. The brew is prepared from 29.2 grams of roasted and ground coffee (approximate average particle size of 780 microns) with 1460 ml of water.

DESCRIPTION OF PREFERRED EMBODIMENTS

The roasting method of the present invention is carried out in two distinct roasting stages. The first stage is of relatively longer duration and lower temperature and the second is of relatively shorter duration and higher temperature. Virtually any type of coffee roasting apparatus can be employed, including conventional batch roasters and continuous roasters. It is preferred that the second roasting stage is initiated immediately after the first stage is concluded. Batch roasters are preferred because of their relative simplicity and because of the relative ease of changing roasting conditions. Preferred batch coffee roasters include the well known horizontal drum roasters such as PROBAT and THERMALO roasters and fluidized bed roasters (e.g., NEOTEC). However, other roasters such as those described at pages 89–97 of Coffee, Vol 2: Technology, Clarke & Macrae (Eds.) Elsevier Applied Science, New York (1987) are suitable, provided only that the roaster can accommodate the two stage roasting sequence and conditions of the present invention.

The roasting process of the present invention is applicable to any type of coffee. As shown in the working examples, highly satisfactory results have been obtained with various types of coffee, including washed arabica coffee from Colombia, natural arabica coffee from Brazil, and robusta coffee from Vietnam.

Coffee beans roasted in accordance with the invention have a reduced free flow density similar to that of fast roast coffee. The density will vary with the type of coffee, as well as with the degree of roast, but is generally within the range of 0.27–0.38. For the least dense beans such as natural arabicas from Brazil, the density of the roasted beans will be generally in the range of 0.27 (for a dark roast) to 0.34 (for a light roast). For the most dense beans such as the robustas, density will generally be in the range of from 0.32 (for a dark roast) to 0.38 (for a light roast). Medium density coffees such as washed arabicas from Colombia, will have an intermediate density, again dependent on roast color, in the range of about 0.29 to 0.37.

The roast color of coffee beans roasted in accordance with the two stage roasting method of the invention is in the range of 4–19 Lu, for all bean types.

The package headspace methylmercaptan content of coffee beans roasted in accordance with the invention, measured as described above, is at least 10 and preferably 10–20 micrograms per gram of coffee. Levels of up to about 40 ug/g are reported in the examples. A level of about 50 or 60 ug/g may constitute a practical upper limit which is well below the level at which methylmercaptan would adversely affect the package headspace aroma.

During the roasting process, the beans are heated primarily by contact with heated roasting gas, typically hot combustion gas and excess air. Some heat may also be imparted to the beans by contact with a hot surface, such as the hot surface of a roasting drum, by radiant heat, or both.

In the first stage of the roasting process, the beans are roasted for a relatively long period of from 5–15 minutes, and preferably about 7.5–11 minutes. Roasting is continued until roast color is in the range of 30–50 Lu, preferably 35–45, for all bean types, and until the beans reach a temperature in the range of about 300–410° F. to assure that roasting starts. The temperature and quantity of heated roasting gas required in each stage of the roasting method to achieve the appropriate bean temperature and roast color will, of course, vary considerably with the type of roasting apparatus. For example, for a PROBAT Model G240 roaster, an air inlet temperature of about 725–925° F. at a flowrate in the range of 2000–2500 ACFM (actual cubic feet per minute) is appropriate during the first roasting stage for a 400 lb. batch of beans, while for a NEOTEC RFB-6 fluidized bed roaster, an air inlet temperature of about 340–410° F. at an air flow rate in the range of 275–350 ACFM is suitable for first stage roasting of a 3.3 pound batch of coffee beans. Air inlet temperatures and flowrates within the foregoing ranges of conditions are also generally suitable for the second roasting stage.

The second stage of the roasting process is preferably initiated immediately after the first stage is concluded. During the second stage, the beans are roasted for a generally shorter time period of from about ½–3½ minutes, preferably about 1–3 minutes. It will be apparent that the total roasting time, i.e., the roasting time of the first and second stages, can be well within the 12–15 minute time period of conventional roasting. Second stage roasting is continued until roast color is in the range of 4–19 Lu for all bean types and until the beans reach a temperature in the range of about 365–450° F.

After reaching the desired extent of roasting in the second stage of the roasting process, roasting is terminated by rapidly cooling the roasted beans to a temperature below that at which roasting would continue. Cooling is conveniently effected in a manner known in coffee roasting by spraying water on the roasted beans, or by contacting the roasted beans with cool air, or both. Suitable cooling systems are widely available commercially. Quenching with water is preferred because it facilitates quickly stopping the roasting process at a desired degree of roast. Quenching with water to achieve a moisture content of about 3–7%, and preferably about 5% by weight based on the weight of the roasted beans, is preferred.

Cooling is preferably effected by first quenching with a water spray to obtain a desired moisture content followed by air-cooling to ambient until the beans are cooled to a temperature of less than about 140° F. and preferably less than 120° F., after which the beans may be permitted to cool to ambient temperature.

EXAMPLE 1

400 lb. of washed arabica coffee from Colombia are roasted in a PROBAT model G240 coffee roaster (made by Probat GmbH, Emmerich, Germany) in a two step process, without stopping between steps. In step one the roaster gas temperature is set at 876° F. and the air flow is set at 2375 ACFM. After 7 minutes and 48 seconds the bean temperature at the end of step one reaches 305° F. The roaster gas temperature is then raised to 1027° F. and the air flow is increased to 2404 ACFM to immediately initiate step two. After an additional 2 minutes and 42 seconds the bean temperature reaches 380° F. and the roasting is stopped by adding 6.5 gallons of quench water over a 15–30 second period. The roasted coffee is then discharged from the roasting chamber and cooled to less than 104° F. Samples from this batch have a roast color of 14.1 Lu., a moisture of 5.4%, a roasted bean density of 0.366 g/cc, and aroma analysis indicates a package headspace methylmercaptan level of 11.2 μg/g coffee. Titratable acidity (in ml of 0.1N sodium hydroxide) is 2.2. A sample taken at the end of step one has a roast color of 36.4 Lu.

Coffee beverages prepared from the roasted coffee of this example are judged by expert tasters as being medium-bodied, smooth and rich with good acidity and floral notes typical of a good quality Colombian (washed arabica) coffee with this degree of roast. The coffee is also judged to be not bitter.

EXAMPLE 2

400 lb. of natural arabica coffee from Brazil are roasted in a PROBAT model G240 coffee roaster in a two step process, without stopping between steps. In step one the roaster gas temperature is set at 860° F. and the air flow is set at 2245 ACFM. After 7 minutes and 48 seconds the bean temperature at the end of step one reaches 324° F. The roaster gas temperature is then raised to 1060° F. and the air flow is increased to 2276 ACFM to immediately initiate step two. After an additional 2 minutes and 30 seconds the bean temperature reaches 404° F. and the roasting is stopped by adding 7.3 gallons of quench water over a 15–30 second period. The roasted coffee is then discharged from the roasting chamber and cooled to less than 104° F. Samples from this batch have a roast color of 9.5 Lu., a moisture of 5.1%, a roasted bean density of 0.327 g/cc, and aroma analysis indicates a package headspace methylmercaptan level of 19.0 μg/g coffee. A sample taken at the end of step one has a roast color of 42.1 Lu.

Coffee beverages prepared from the roasted coffee of this example are judged by expert tasters as being full-bodied with earthy notes and some acidity typical of a good quality Brazilian (natural arabica) coffee with this degree of roast. The coffee is also judged to be not bitter.

EXAMPLE 3

400 lb. of robusta coffee from Vietnam are roasted in a PROBAT model G240 coffee roaster in a two step process, without stopping between steps. In step one the roaster gas temperature is set at 860° F. and the air flow is set at 2175 ACEM. After 9 minutes and 48 seconds the bean temperature at the end of step one reaches 324° F. The roaster gas temperature is raised to 1060° F. and the air flow is increased to 2350 ACFM to immediately initiate step two. After an additional 2 minutes and 42 seconds the bean temperature reaches 402° F. and the roasting is stopped by adding 7.4 gallons of quench water over a 15–30 second period. The roasted coffee is then discharged from the roasting chamber and cooled to less than 104° F. Samples from this batch have a roast color of 15.2 Lu., a moisture of 5.8% a roasted bean density of 0.353 g/cc and aroma analysis indicates a package headspace methylmercaptan level of 21.0 μg/g coffee. A sample taken at the end of step one has a roast color of 44.0 Lu.

Coffee beverages prepared from the roasted coffee of this example are judged by expert tasters as being light-bodied but hearty/robust with a characteristic peanut shell flavor typical of a robusta coffee with this degree of roast. The coffee is also judged to be not bitter.

EXAMPLE 4

3.3 lb. (1500 g) of natural arabica coffee from Brazil are roasted in a NEOTEC RFB-6 coffee roaster (made by Neuhaus-Neotec GmbH, Dusseldorf, Germany) in a two step process, without stopping between steps. In step one the roaster gas temperature is set at 392° F. and the air flow is set at 318 ACFM. After 5 minutes the bean temperature at the end of step one reaches 352° F. The roaster gas temperature is raised to 665° F. and the air flow is increased to 500 ACFM to immediately initiate step two. After an additional 1 minute the bean temperature reaches 448° F. and the roasting is stopped by adding 0.4 lb. (180 g) of quench water over a 15–30 second period. The roasted coffee is then discharged from the roasting chamber and cooled to less than 104° F. Samples from this batch have a roast color of 7.4 Lu., a moisture of 5.2% a roasted bean density of 0.285 g/cc and aroma analysis indicates a package headspace methylmercaptan level of 26.0 μg/g coffee. Titratable acidity is 1.31. A sample taken at the end of step one has a roast color of 39.2 Lu.

EXAMPLE 5

3.3 lb.(1500 g) of natural arabica coffee from Brazil are roasted in a NEOTEC RFB-6 coffee roaster in a two step process, without stopping between steps. In step one the roaster gas temperature is set at 365° F. and the air flow is set at 308 ACFM. After 9 minutes the bean temperature at the end of step one reaches 350° F. The roaster gas temperature is raised to 664° F. and the air flow is increased to 504 ACFM to immediately initiate step two. After an additional 1 minute the bean temperature reaches 450° F. and the roasting is stopped by adding 0.4 lb. (180 g) of quench water over a 15–30 second period. The roasted coffee is then discharged from the roasting chamber and cooled to less than 104° F. Samples from this batch have a roast color of 8.2 Lu., a moisture of 5.5% a roasted bean density of 0.282 g/cc and aroma analysis indicates a package headspace methylmercaptan level of 31.0 μ/g coffee. Titratable acidity is 1.35. A sample taken at the end of step one has a roast color of 44.3 Lu.

EXAMPLE 6

3.3 lb. (1500 g) of natural arabica coffee from Brazil are roasted in a NEOTEC RFB-6 coffee roaster in a two step process, without stopping between steps. In step one the roaster gas temperature is set at 347° F. and the air flow is set at 301 ACFM. After 13 minutes the bean temperature at the end of step one reaches 334° F. The roaster gas temperature is raised to 637° F. and the air flow is increased to 492 ACFM to immediately initiate step two. After an additional 1 minute the bean temperature reaches 432° F. and the roasting is stopped by adding 0.4 lb. (180 g) of quench water over a 10–15 second period. The roasted coffee is then discharged from the roasting chamber and cooled to less than 104° F. Samples from this batch have a roast color of 12.4 Lu., a moisture of 5.2% a roasted bean density of 0.303 g/cc and aroma analysis indicates a package headspace methylmercaptan level of 17.0 μg/g coffee. Titratable acidity is 1.64. A sample taken at the end of step one has a roast color of 44.8 Lu.

EXAMPLE 7

3.3 lb. (1500 g) of natural arabica coffee from Brazil are roasted in a NEOTEC RFB-6 coffee roaster in a two step process, without stopping between steps. In step one the roaster gas temperature is set at 392° F. and the air flow is set at 318 ACFM. After 5 minutes the bean temperature at the end of step one reaches 352° F. and the roaster gas temperature is raised to 581° F. The air flow is increased to 467 ACFM to immediately initiate step two. After an additional 1 minute the bean temperature has reached 419° F. and the roasting is stopped by adding 0.4 lb. (180 g) of quench water over a 10–15 second period. The roasted coffee is then discharged from the roasting chamber and cooled to less than 104° F. Samples from this batch have a roast color of 16.0 Lu., a moisture of 5.5% a roasted bean density of 0.317 g/cc and aroma analysis indicates a package headspace methylmercaptan level of 39.0 μg/g coffee. Titratable acidity is 1.87. A sample taken at of step one has a roast color of 39.2 Lu.

The results of Examples 1–7 are summarized in Table I.

TABLE I

Summary of Results of Examples 1–7

| Example | Coffee Type | Density (g/cc) | Roast Color (Lu) | Methylmercaptan(1) (ug/g coffee) |
|---|---|---|---|---|
| 1 | washed arabicas | 0.366 | 14.1 | 11.2 |
| 2 | natural arabicas | 0.327 | 9.5 | 19.0 |
| 3 | robusta | 0.353 | 15.2 | 21 |
| 4 | natural arabicas | 0.285 | 7.4 | 26 |
| 5 | natural arabicas | 0.282 | 8.2 | 31 |
| 6 | natural arabicas | 0.303 | 12.4 | 17 |
| 7 | natural arabicas | 0.317 | 16 | 39 |

(1) Package headspace methylmercaptan content.

A significant portion of consumers have judged blends of roasted washed arabica, natural arabica and robusta coffees, roasted by the present two stage method, to be full-flavored, not bitter tasting, smooth tasting, having a good aroma, and having rich coffee flavor.

COMPARATIVE EXAMPLE 1

400 lb. of washed arabica coffee from Colombia are roasted in a PROBAT model G240 coffee roaster in a one step process. The roaster gas temperature is set at 860° F. and the air flow is set at 2175 ACFM. After 14 minutes the bean temperature reaches 388° F. and the roasting is stopped by adding 6.5 gallons of quench water over a 15–30 second period. The roasted coffee is then discharged from the roasting chamber and cooled to less than 104° F. Samples from this batch have a roast color of 13.9 Lu., a moisture of 5.5% a roasted bean density of 0.389 g/cc and aroma analysis indicates a package headspace methylmercaptan level of 7.6 μ/g coffee. Titratable acidity is 1.98.

COMPARATIVE EXAMPLE 2

210 lb. of washed arabica coffee from Colombia are roasted in a NEOTEC model RFB200 roaster in a one step process. The roaster gas temperature is set at 720° F. and the air flow is set at 18800 ACFM. After 2 minutes the bean temperature at the end of step one reaches 419° F. and the roasting is stopped by adding 3.5 gallons of quench water over a 10–15 second period. The roasted coffee is then discharged from the roasting chamber and cooled to less than 104° F. Samples from this batch have a roast color of 14 Lu., a moisture of 5.5% a roasted bean density of 0.365 g/cc and aroma analysis indicates a package headspace methylmercaptan level of 6.9 μ/g coffee. Titratable acidity is 2.3.

COMPARATIVE EXAMPLE 3

4.4 lb. (2000 g) of natural arabica coffee from Brazil are roasted in a NEOTEC RFB-6 coffee roaster in a one step process. The roaster gas temperature is set at 455° F. and the air flow is set at 395 ACFM. After 6 minutes the bean temperature reaches 421° F. and the roasting is stopped by adding 0.4 lb. (180 g) of quench water over a 10–15 second period. The roasted coffee is then discharged from the roasting chamber and cooled to less than 104° F. Samples from this batch have a roast color of 15.6 Lu., a moisture of 5.3% a roasted bean density of 0.336 g/cc and aroma analysis indicates a package headspace methylmercaptan level of 1.8 μ/g coffee. Titratable acidity is 1.68.

The results of comparison examples are summarized in Table II.

TABLE II

Summary of Results of Comparison Examples 1–3

| Example | Coffee Type | Density (g/cc) | Roast Color (Lu) | Methylmercaptan(1) (ug/g coffee) |
|---|---|---|---|---|
| CX1 | washed arabicas | .389 | 13.9 | 7.6 |
| CX2 | washed arabicas | .365 | 14 | 6.9 |
| CX3 | natural arabicas | .336 | 15.6 | 1.8 |

Each type of coffee bean has a characteristic titratable acidity for a given level of roast. In general, coffee beverages brewed from higher quality beans have a higher titratable acidity than those from lower quality beans. Coffee beans roasted in accordance with the present invention have a generally high titratable acidity at a given density and roast color.

Roast and ground coffee can be prepared from the roasted coffee using conventional grinding equipment. Conventional grind sizes are suitable, including percolator (approximate average particle size 1130 micron) drip or ADC (approx. 800 micron) and fine (approx. 350–600 micron). The density of the roasted and ground coffee can be adjusted using a conventional normalizer.

What is claimed is:
1. A method of roasting coffee which comprises:
    (a) in a first stage, contacting green coffee beans with heated roasting gas for a time period of from 5 to 15 minutes until the coffee beans are roasted to a roast color of from 30–50 Lu;
    (b) in a second stage, contacting the coffee beans roasted in the first stage with heated roasting gas for a time period of from 0.5 to 3.5 minutes to produce roasted coffee having a roast color of from 4–19 Lu; and
    (c) rapidly cooling the roasted coffee to terminate roasting to produce roasted coffee having a density of from 0.27 to 0.38, a roast color of 4–19 Lu and a package headspace methylmercaptan content of at least 10 micrograms per gram of coffee.
2. A method according to claim 1 wherein the second stage is effected substantially immediately after said first stage.
3. A method according to claim 2 wherein roasting of the coffee beans in said first stage is effected in a roasting chamber and wherein roasting of the coffee beans in said second stage is effected in the same roasting chamber.
4. A method according to claim 2 wherein roasting of the coffee beans in said first stage is effected in a fluidized bed in which the coffee is fluidized in said roasting gas and in which roasting in said second stage is also effected in said fluidized bed.

5. A method according to claim 1 wherein roasting in said first stage is effected for from 7.5 to 11 minutes to a roast color of 35–45 Lu and wherein roasting in said second stage is effected from 1–3 minutes to a roast color of 4–19 Lu.

6. A method according to claim 1 wherein said coffee comprises robusta coffee and wherein the roasted coffee has a density of from 0.32 to 0.38.

7. A method according to claim 1 wherein the coffee comprises natural arabicas coffee and wherein the roasted coffee has a density of from 0.27 to 0.34.

8. A method according to claim 1 wherein the coffee comprises washed arabicas coffee and wherein the roasted coffee has a density of from 0.29 to 0.37.

* * * * *